US006441962B1

(12) United States Patent
Bakhti et al.

(10) Patent No.: US 6,441,962 B1
(45) Date of Patent: Aug. 27, 2002

(54) OPTICAL FILTER WITH LITTLE VARIATION IN CHROMATIC DISPERSION

(75) Inventors: Fatima Bakhti, Orsay; Pierre Sansonetti, Palaiseau, both of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/689,867

(22) Filed: Oct. 13, 2000

(30) Foreign Application Priority Data

Oct. 28, 1999 (FR) .............................. 99 13495

(51) Int. Cl.[7] .............................. G02B 5/18; G02B 6/34
(52) U.S. Cl. ..................... 359/570; 359/569; 359/575; 385/37
(58) Field of Search ................. 359/569, 575, 359/3, 8, 566, 570, 572, 115, 124; 385/37

(56) References Cited

U.S. PATENT DOCUMENTS

| | | | | |
|---|---|---|---|---|
| 5,068,833 A | * | 11/1991 | Lipschutz | 367/98 |
| 5,091,916 A | | 2/1992 | Cimini, Jr. et al. | 372/96 |
| 5,717,799 A | * | 2/1998 | Robinson | 385/37 |
| 6,137,604 A | * | 10/2000 | Bergano | 385/24 |
| 6,141,370 A | * | 10/2000 | Avrutschy et al. | 372/102 |
| 6,201,909 B1 | * | 3/2001 | Kewitsch et al. | 385/37 |
| 6,201,910 B1 | * | 3/2001 | Boschis et al. | 385/37 |
| 6,266,463 B1 | * | 7/2001 | Laming et al. | 385/37 |
| 6,304,696 B1 | * | 10/2001 | Patterson et al. | 385/37 |

FOREIGN PATENT DOCUMENTS

| | | |
|---|---|---|
| EP | 0 607 782 A1 | 7/1994 |
| EP | 0 940 695 A1 | 9/1999 |
| EP | 1081881 A2 * | 3/2001 |
| FR | 2 768 233 A1 | 3/1999 |
| WO | WO 99/31537 A | 6/1999 |

OTHER PUBLICATIONS

T. Komukai, et al., "Fabrication of nonlinearly chirped fiber Bragg gratings for higher–order dispersion compensation", OFC '98 Technical Digest. 1998.*

M Ibsen, et al., "30 dB sampled gratings in germanosilicate planar waveguides", Electronics Letters, Vo. 32, No. 24, Nov. 21, 1996, pp. 2233–2235.*

J.A.R. Williams, et al., "In–Fiber Grating Systems for Pulse Compression and Complete Dispersion Compensation", Optical Fibre Gratings and Their Applications, IEE Colloquium on, 1995, pp 9/1–9/6. 1995 IEE, London.*

B.J. Eggleton, et al., "Long periodic superstructure Bragg gratings in opticol fibers", Electron. Lett., vol. 30, No. 19, Sep. 15, 1994, pp. 1620–1622.*

F. Ouellette, et al., "All–Fiber Devices for Chromatic Dispersion Compensation Based on Chirped Distributed Resonant Coupling", J. Lightwave Techn., vol. 12, No. 10, Oct. 1994, pp. 1728–1738.*

* cited by examiner

Primary Examiner—Cassandra Spyrou
Assistant Examiner—John Juba, Jr.
(74) Attorney, Agent, or Firm—Sughrue Mion, PLLC

(57) ABSTRACT

An optical filter has little variation in chromatic dispersion over its passband, the filter being constituted by a Bragg grating whose pitch varies as a function of distance along the filter with a change in the sense of its concavity. The filter also presents apodization, e.g. apodization by a super-Gaussian function or Blackman apodization. The filter of the invention is adapted to high data rate dense WDM transmission systems.

17 Claims, 3 Drawing Sheets

OPTICAL FILTER WITH LITTLE VARIATION IN CHROMATIC DISPERSION

The invention relates to the field of optical filters, and more particularly optical filters used for dropping or adding wavelengths in wavelength division multiplex (WDM) optical fiber transmission systems. Such filters are referred to as optical add-and-drop multiplexers (OADMs).

BACKGROUND OF THE INVENTION

WDM transmission uses optical filters having a transfer function that is as rectangular as possible, and suitable for use over a broad band; typically, WDM multiplexers operate around 1550 nm and extend over a wavelength range of 25 nm to 100 nm. An ideal filter would present phase that is linear, i.e. group delay time that is constant, with no chromatic dispersion.

For these purposes, proposals have been made to use Bragg gratings written in the fibers. Such gratings are formed in a fiber by periodic or substantially periodic modulation of the index of the fiber. The term "pitch" is used to designate the modulation period along the fiber. It is possible with Bragg gratings to obtain a spectral response that is practically ideal, i.e. close to that which is desired. However, under such circumstances, the phase response of the filter becomes less and less linear towards the edges of the filter, so its dispersion becomes large, and as a result its usable bandwidth is much less than the total bandwidth of the filter.

Thus, L. R. Chen and P. W. E. Smith in "Fiber Bragg grating transmission filters with near-ideal filter response", Electronics Letters, Vol. 34, No. 21, October 1998, pp. 2048–2050, propose filters that present "chirp", i.e. in which pitch varies along the filter. More precisely, that article investigates the phase response of the filters, i.e. constant group velocity and zero dispersion, and it proposes using a filter made up of two superposed Bragg gratings, each presenting chirp that is linear.

Proposals have also been made to apodize the filter, i.e. to vary the modulation index of the fiber as a function of its length. By way of example, T. A. Strasser et al. in "UV-induced fiber grating OADM devices for efficient bandwidth utilization", OFC'96, PD8-2 to PDB-4, propose a filter having Gaussian apodization, i.e. the envelope of the index modulation function of the fiber is Gaussian. The filter does not present chirp, and the modulation pitch is constant.

B. J. Eggleton et al. in "Implications of fiber grating dispersion for WDM communication systems", IEEE Photonics Technology Letters, Vol. 9, No. 10, October 1997, pp. 1403–1405, state that apodization is a solution that enables crosstalk to be reduced between channels in filters for WDM optical fiber transmission systems. That article raises the problem of the chromatic dispersion caused by apodized filters, and proposes a compromise between filter characteristics and filter-induced dispersion, for apodization that is Gaussian or super-Gaussian.

OBJECTS AND SUMMARY OF THE INVENTION

The invention proposes a filter for a WDM optical fiber transmission system, and in particular for a dense WDM (DWDM) optical fiber transmission system, which presents simultaneously good spectral response and also dispersion within the passband of the filter that is acceptable.

More precisely, the invention provides a variable pitch Bragg grating having pitch, expressed as a function of distance, which is upwardly concave over a first portion of the grating and downwardly concave over a second portion of the grating.

Preferably, the function is of zero slope at the ends of the grating.

In an embodiment, the first portion extends over one half of the grating, and the second portion extends over the other half of the grating.

Preferably, the pitch is expressed as a quadratic function of distance over the first portion, and as a quadratic function of distance over the second portion.

In another embodiment, over the first portion, the pitch is expressed as a function of distance that is a polynomial of degree less than 6 and, over the second portion, as a function of distance that is a polynomial of degree less than 6.

In yet another embodiment, the pitch is expressed as a linear function of distance over a third portion of the grating extending between said first and second portions.

Preferably, the tangent to the curve giving pitch as a function of distance presents, at each end of the grating, and over a distance of less than 10% the length L of the grating, a slope whose absolute value is less than half the ratio $(\Lambda_{max}-\Lambda_{min})/L$ of pitch variation over the length of the grating.

In an embodiment, the grating presents variation in chromatic dispersion lying in a range of ±150 ps/nm over a wavelength bandwidth equal to at least half its −3 dB bandwidth.

It is also advantageous for the ratio between the −3 dB width and the −30 dB width to lie in the range 0.5 to 1.

Advantageously, the attenuation in reflection at 25 GHz from the center wavelength of the filter is greater than 30 dB, and preferably greater than 35 dB. In addition, the attenuation in transmission at the center wavelength of the filter is less than 0.05 dB.

The apodization can be super-Gaussian apodization with an a coefficient in the range [0.5; 1] or Blackman apodization with a Blackman coefficient in the range ]0; 0.2[, or indeed hyperbolic tangent apodization with a coefficient in the range ]0; 1[.

The invention also provides an optical filter for such a Bragg grating, and a WDM transmission system including at least one such Bragg grating.

BRIEF DESCRIPTION OF THE DRAWINGS

Other characteristics and advantages of the invention will appear on reading the following description of embodiments given by way of example only, and with reference to the figures, in which.

MORE DETAILED DESCRIPTION

To provide a filter having both good spectral response and acceptable dispersion, the invention proposes using a Bragg grating presenting chirp or pitch variation that is S-shaped, i.e. in which the second derivative of the function which associates the pitch of the filter with position along the filter changes sign. It is also possible to speak in terms of the concave side changing in the graph of the same function.

This chirp can be associated with an apodization shape to improve the spectral characteristics of the filter; such apodization of the filter typically makes it possible to minimize the sidelobes of the filter.

The invention makes it possible to provide a filter which reflects at least one channel and which passes the other channels. The spectral characteristics of the filter are measured in reflection by considering the attenuation of the filter outside the reflection band; it is advantageous for the sidelobes to be attenuated by at least 30 dB relative to the wavelengths that are reflected. For filter that reflects a single channel only, attenuation at 25 GHz or 50 GHZ is preferably greater than 30 dB, or even 35 dB. The value of 25 GHz or 50 GHz between channels depends on how channels are distributed in the multiplex. It is also possible to. evaluate the spectral characteristics of the filter in transmission, considering attenuation for a transmitted wavelength relative to the power applied to the inlet of the filter. This attenuation is preferably less than 0.05 dB. In transmission, it is also possible to consider the attenuation in transmission at the wavelength of the channel which is reflected compared with attenuation at the wavelengths that are transmitted by the fiber. Under such circumstances, it is advantageous for the attenuation at the reflected wavelength to be at least 30 dB or even 35 dB compared with attenuation at the adjacent wavelengths that are transmitted. In this case also it is possible to consider values of 25 GHZ or 50 GHZ between channels.

In terms of the steepness of the flanks of the transfer function of the filter, it is possible to consider the ratio between the −3 dB bandwidth of the filter over the −30 dB bandwidth of the filter. This ratio is advantageously as great as possible, and values greater than 0.5, and preferably greater than 0.7 are advantageous.

In terms of dispersion, it can be considered to be acceptable when there exists a central value $D_0$ around which dispersion varies within the band of the filter, and the range of variation in the dispersion around said central value lies typically in a band of ±150 ps around the central dispersion value $D_0$.

Figure 1:
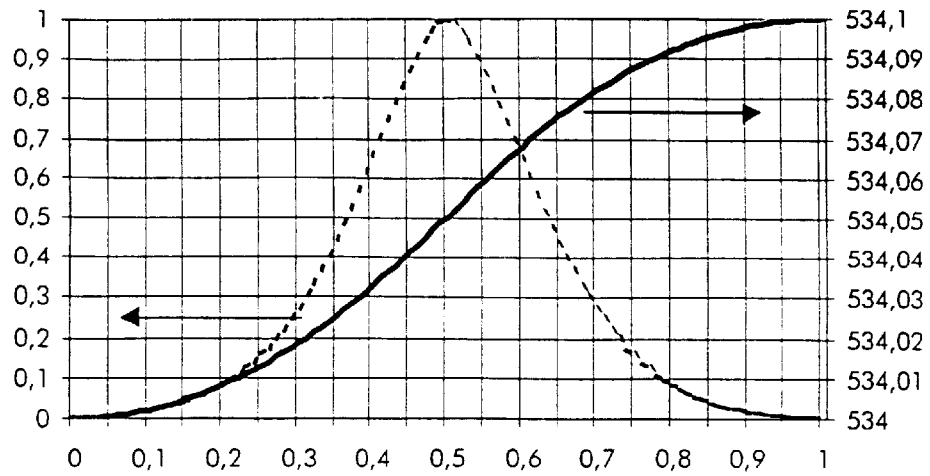
FIG. 1 is a graph showing the index modulation and the pitch of a filter of the invention.

FIG. 1 is a graph showing the index and the filter pitch of the invention. Distance z/L along the filter is plotted along the abscissa of the figure. This distance is normalized, with z being the position and L being the total length of the filter. Modulation index is plotted in dashed lines and its scale is marked up the ordinate on the left. Index modulation is normalized relative to the maximum value of index modulation. The pitch of the grating is plotted as a solid line, with its scale being marked up the ordinate on the right of the figure, in nanometers. Clearly pitch is not exactly a continuous function, so speaking in terms of a function associating pitch with distance along the filter is not strictly true: nevertheless, such a function is used for convenience as is conventional in this technical field.

FIG. 1 shows that pitch variation along the grating is S-shaped: specifically, pitch increases along the grating; over a first portion corresponding to the beginning of the grating the concave side faces upwards, in other words slope is increasing, and the second derivative of pitch relative to distance is positive. Over a second portion, corresponding to the end of the grating, to the right in the figure, the concave side faces downwards, in other words slope decreases and the second derivative of pitch relative to distance is negative. In the example shown in the figure, the second derivative of pitch is zero in the middle of the grating. In addition, at the ends of the grating, the slope of the pitch is substantially zero, in other words the pitch varies very little, e.g. in comparison with the amount it varies in the middle of the filter.

S-shaped chirp can be described by using the following criterion: the tangent to the curve giving pitch as a function of distance presents a slope at each end of the grating and over a distance of less than 10% the length L of the grating, where said slope is smaller in absolute value than half the ratio $(\Lambda_{max}-\Lambda_{min})$L of pitch variation divided by grating length.

Quantitatively, it is possible to use grating pitch variation as specified by the following function:

$$\Lambda(z) = \begin{cases} \Lambda_{\min} + az^2 & 0 \le z \le r_1 L \\ \frac{(\Lambda_{\max} - \Lambda_{\min} - a((r_1 L)^2 + (r_2 L)^2))}{(1 - r_1 - r_2)L}(z - r_1 L) + \Lambda_{\min} + a(r_1 L)^2 & r_1 L \le z \le (1 - r_2)L \\ \Lambda_{\max} a(z - L)^2 & (L - r_2)L \le z \le L \end{cases}$$

$$a = \frac{\Lambda_{\max} - \Lambda_{\min}}{r_1(2 - r_1 - r_2)L^2}$$

an z being distance along the filter. In this equation, z varies over the range 0 to L, in other words it is not normalized.

In other words, in this model of grating pitch variation, pitch begins by varying over a first portion of the grating as a quadratic function starting from the value $\Lambda_{min}$, then it varies over a third portion of the grating as a linear function, and finally over a second portion of the grating it varies again as a quadratic function to reach the value $\Lambda_{max}$. The coefficients $r_1$ and $r_2$ correspond to the proportions over which pitch varies quadratically. It is also possible to consider a function which is a polynomial of degree lying in the range 2 to 5 for the first portion, a polynomial of degree lying in the range 2 to 5 for the second portion, and where appropriate a linear function for the third portion. The concave sides face in opposite directions in the first and second portions, as stated above.

In the example of the figure, the coefficients $r_1$ and $r_2$ are both equal to 0.5, i.e. pitch begins by varying as a quadratic function with its convex side facing upwards, and then as a quadratic function with its convex side facing downwards. In this case, grating pitch variation is given by the following formula:

$$\Lambda(z) = \begin{cases} \Lambda_{\min} + az^2 & 0 \le z \le L/2 \\ \Lambda_{\max} - a(z - L)^2 & L/2 \le z \le L \end{cases}$$

and in this case $a=2(\Lambda_{max}-\Lambda_{min})/L2$. This single parameter determines the appearance of the chirp insofar as the slope of the chirp is made to be zero at both ends. The chirp is then made up of two parabolas of zero slope at the ends of the filter.

Under such circumstances, the maximum variation in the pitch is $\Lambda_{max}-\Lambda_{min}$, and the slope between abscissa points 0 and L/10 or 9L/10 and L is, in absolute value, less than $4(\Lambda_{max}-\Lambda_{min})/(10L)$ The apodization function shown in the figure is a super-Gaussian apodization function, having the following characteristics:

$$\Delta n(z) = \Delta \left( n_{max} \left( \frac{\Delta n_{min}}{\Delta n_{max}} \right) \right)^{\left\{ \frac{z-z_0}{\max(z_0, L-z_0)} \right\}^{2a}}$$

In this formula, $\Delta n_{max}$ is the maximum amplitude of local variation in refractive index, $\Delta n_{min}$ is the minimum amplitude of local variation in refractive index, and $z_0$ is the position of the maximum amplitude along the filter; this position is not normalized. $\underline{a}$ is the super-Gaussian parameter. In the example of the figure, $\underline{a}z_0 = L/2$. When a=1, the formula reduces to being Gaussian, and the term "super-Gaussian" is used for cases where a is not equal to 1.

The apodization parameters are preferably selected to lie in the following ranges:

$10^{-4} \leq \Delta n_{max} \leq 10^{-3}$ $10^{-6} \leq \Delta n_{min} \leq 10^{-4}$ If the index is written K, i.e.:

$K(z) = K_0 \cdot \Delta n(z)$ then $\underline{a}$ is preferably $\ln(K(z)/K_0)$ or $\ln(\Delta n(z))$ which is a function of $\underline{z}$ that is close to a linear function over the range [0; L/2] or over the range [L/2; 0]. In the super-Gaussian case, the following applies:

$$\ln(K(z)/K_0) = \ln(\Delta n(z)) = \left( \frac{z - z_0}{\max(z_0, L - z_0)} \right)^{2a}$$

Under such circumstances, $\ln(\Delta n(z))$ is a linear function of z with a Gaussian; with a super-Gaussian, $\ln(\Delta n(z))$ is not a linear function, and it is advantageous to ensure that $0.5 \leq a < 1$. A function is then obtained which is close to linear.

Figure 2:
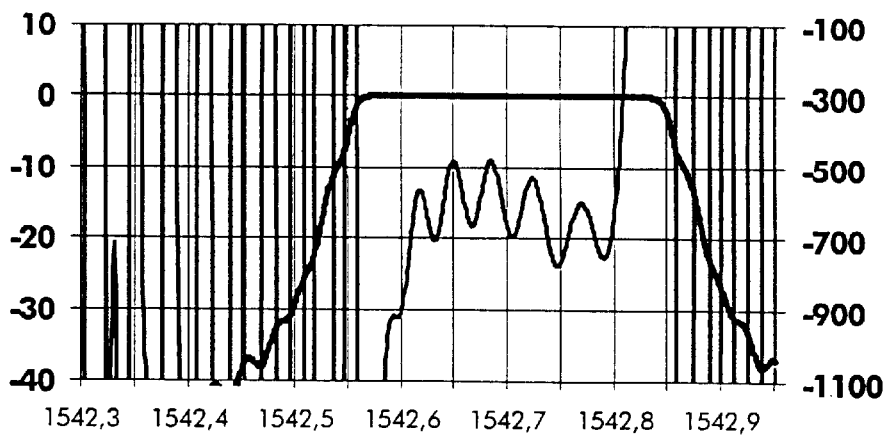
FIG. 2 is a graph of the spectral response and the dispersion of the FIG. 1 filter.

FIG. 2 shows the spectral and dispersion characteristics of the FIG. 1 filter. Wavelength in nanometers is plotted along the abscissa; the bold line in the figure shows the spectral response of the filter, with the scale thereof in dB being shown up the ordinate on the left of the figure. It can be seen that the filter has a passband with zero attenuation over a band having a width of 0.3 nm, and that it has steep flanks: the width −10 dB width of the filter is about 0.33 nm. Chromatic dispersion is plotted in the figure in finer lines, with its scale in ps/nm being marked up the ordinate on the right of the figure. Over the entire band between 1542.61 nm to 1542.8 nm, the chromatic dispersion lies in the range −500 ps/nm to −700 ps/nm, and therefore remains substantially constant, when compared with the corresponding variation in prior art filters. As a result, the usable bandwidth in the filter is larger than that in prior art filters, as is explained with reference to FIGS. 8 and 9.

The figure corresponds to the above specified choice of $r_1 = r_2 = 0.5$ with a=0.8. The filter has a total length L of 50 mm; the maximum amplitude of index modulation $\Delta n_{max}$ is $2.9 \times 10^{-4}$, and the minimum amplitude of index modulation $\Delta n_{min}$ is $10^{-6}$. $\Lambda_{min}$ and $\Lambda_{max}$ are respectively 534 nm and 534.1 nm. The fiber used was a fiber manufactured by Alcatel as a photosensitive cladding fiber.

As shown in the figure, the invention makes it possible to obtain a filter having good spectral response and acceptable dispersion simultaneously. Over more than half the −3 dB passband of the filter, the chromatic dispersion of the filter is constant at ±150 ps/nm, or preferably at ±100 ps/nm around a mean value $D_0$ for chromatic dispersion of −600 ps/nm. In reflection, the attenuation for the sidelobes at 50 GHz is greater than or equal to 40 dB. In transmission, the attenuation at the center wavelength, relative to the adjacent channel at 50 GHz is 0.05 dB. The ratio of the −3 dB bandwidth over the −30 dB bandwidth is 0.7.

Figure 3:
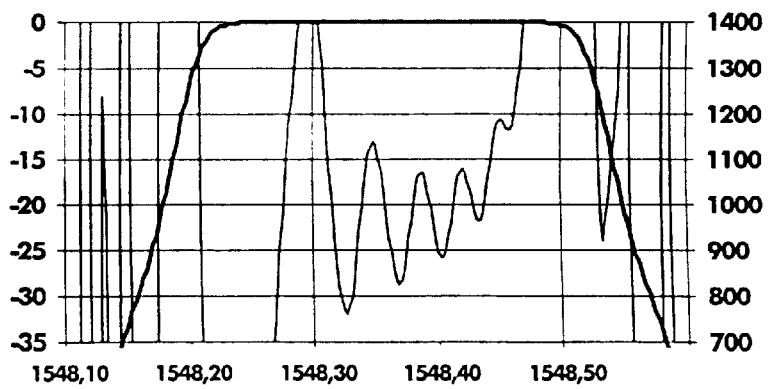
FIGS. 3 to 7 are graphs showing the spectral response and the dispersion of other filters of the invention.

FIGS. 3 to 7 are respective graphs of the spectral response and of the dispersion of filters constituting other embodiments of the invention. FIG. 3 is a graph showing the spectral response and the dispersion of a filter of the invention having a different apodization function; the scales are the same. In the example of FIG. 3, apodization was performed using a Blackman function of the type:

$$\Delta n(z) = \Delta n_{max} \frac{1 + (1+B)\cos\left\{ \frac{\pi(z-z_0)}{\max(z_0, L-z_0)} \right\} + B\cos\left\{ \frac{2\pi(z-z_0)}{\max(z_0, L-z_0)} \right\}}{2 + 2B}$$

in which B is the Blackman function and preferably selected to lie in the range [0; 0.2]. $\Delta n_{max}$ is the maximum index variation and can be selected as in the super-Gaussian apodization case. $z_0$ is the position at which the maximum apodization value was reached.

In the example of FIG. 3, the pitch chirp was identical to that of FIG. 2. The Blackman coefficient B was zero. The maximum index variation $\Delta n_{max}$ was $1.7 \times 10^{-4}$; the initial fiber was the same as in FIG. 2. The grating had a length L of 50 mm, and $z_0$ was L/2. Chromatic dispersion varied about a value $D_0$ of 980 ps/nm over a range of ±150 ps/nm in a band extending from 1551.83 nm to 1551.93 nm. In reflection, attenuation in the sidelobes at 50 GHz was 31 dB. In transmission, attenuation at the center wavelength, relative to the adjacent channel at 50 GHz was less than or equal to 0.05 dB. The ratio of −3 dB bandwidth over −30 dB bandwidth was 0.74.

Figure 4:
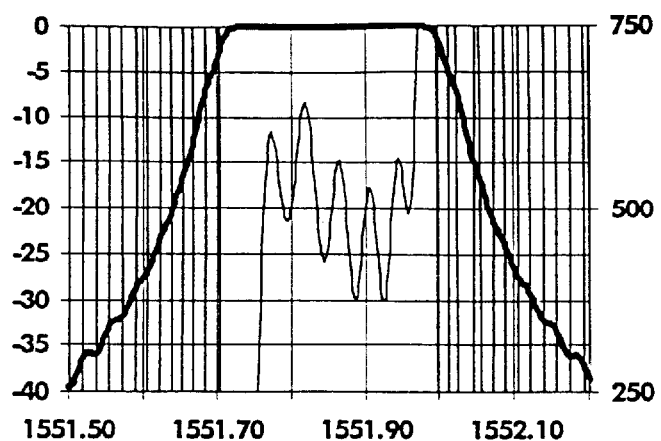
Figure 5:
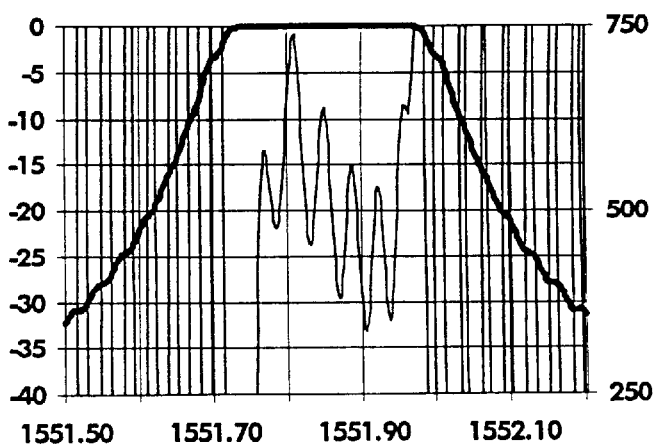
Figure 6:
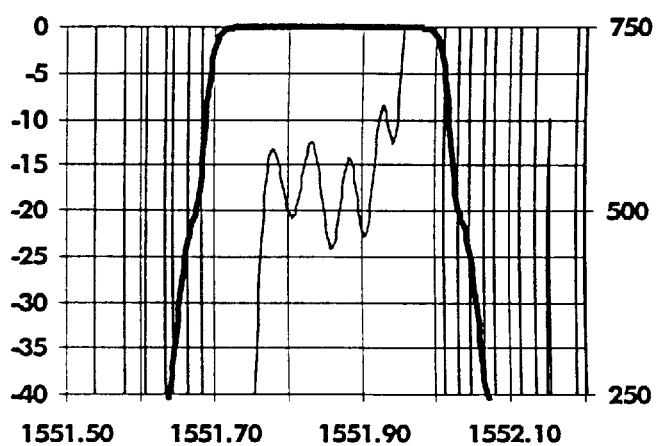

FIGS. 4, 5, and 6 apply to respective filters of the same type as in FIG. 2, using a super-Gaussian apodization function. They differ from FIG. 2 by having a different value for the a coefficient of the super-Gaussian expression, with values equal respectively to 0.7, 0.6, and 0.9. As in FIG. 2, the function giving chirp was a quadratic function in each of the two halves of the grating.

In FIG. 4, the grating had a length of 45 mm with index variation $\Delta n_{max} - \Delta n_{min}$ of $3 \times 10^{-4}$. The ratio of −3 dB bandwidth over −30 dB bandwidth was 0.56. In reflection, attenuation for sidelobes at 50 GHz was greater than or equal to 40 dB. In transmission, attenuation at the center wavelength, relative to the adjacent channel at 50 GHz was less than or equal to 0.05 dB. Chromatic variation varied around a value $D_0$ of 500 ps/nm over a range of ±150 ps/nm in the band extending from 1551.75 nm to 1551.96 nm.

In FIG. 5, the grating had a length of 50 mm with index variation $\Delta n_{max} - \Delta n_{min}$ of $3 \times 10^{-4}$. The ratio of −3 dB bandwidth over −30 dB bandwidth was 0.45. In reflection, attenuation for sidelobes at 50 GHz was greater than or equal to 50 dB. In transmission, attenuation at the center wavelength, relative to the adjacent channel at 50 GHz was less than or equal to 0.05 dB. Chromatic variation varied around a value $D_0$ of 500 ps/nm over a range of ±150 ps/nm in the band extending from 1551.81 nm to 1551.90 nm. It varied over a range of ±200 ps/nm about the same value $D_0$ over the band 1551.76 nm to 1551.97 nm.

FIG. 6 shows the case of a grating having a length of 40 mm, with index variation $\Delta n_{max} - \Delta n_{min}$ of $2.6 \times 10^{-4}$. The ratio of the −3 dB bandwidth over the −30 dB bandwidth was 0.77. The chromatic dispersion varied over a range of ±100 ps/nm around a value $D_0$ of 550 ps/nm, between the wavelengths of 1551.76 nm and 1551.97 nm. In reflection, the attenuation of sidelobes at 50 GHz was greater than or equal to 40 dB. In transmission, the attenuation at the center wavelength compared with the adjacent channel at 50 GHz was less than or equal to 0.05 dB.

Figure 7:
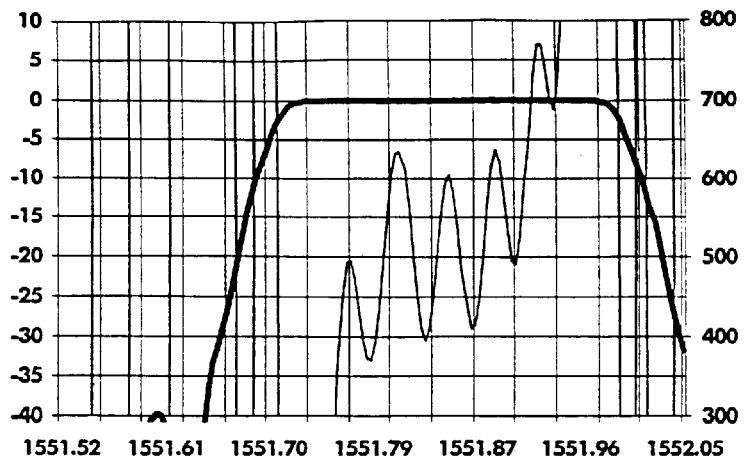

FIG. 7 is a graph analogous to those in the preceding figures, for an apodization function of the hyperbolic tangent type, which can be specified by the following equation:

$$\Delta n_{ap}(z) = \Delta n_0 \left\{ 1 + \tanh\left\{ \beta \left( 1 - 2 \left| \frac{z - z_0}{\max[z_0, (L - z_0)]} \right|^a \right) \right\} \right\}$$

where α is a positive coefficient, $$\beta = \tanh^{-1}\left(\frac{\Delta n_{\max} - \Delta n_{\min}}{\Delta n_{\max} + \Delta n_{\min}}\right) \text{ and}$$

$$\Delta n_0 = \frac{\Delta n_{\max}}{1 + \tanh(\beta)}$$

In this figure, the grating had a length of 45 nm, with maximum index variation $\Delta n_{max}$ equal to $1.8 \times 10^{-4}$. The parameter α for the figure was 0.5. Between 1551.85 nm and 1551.93 nm, chromatic dispersion varied„over a range of ±150 ps/nm about a value $D_0$ of 1000 ps/nm. The ratio of the −3 dB bandwidth over the −30 dB bandwidth was 0.74. In reflection, the attenuation of sidelobes at 50 GHz was greater than or equal to 40 dB. In transmission, the attenuation at the center wavelength relative to the adjacent channel at 50 GHZ was less than or equal to 0.05 dB. More generally, the parameter a should preferably lie in the range ]0; 1[.

Filters of the invention can be used in WDM transmission systems, and in particular in so-called "dense" systems operating at high data rates with channel spacings of the order of 25 GHz or 50 GHz. A filter of the invention can be used to drop a single channel. It is thus possible to use filters of the invention specifically as filters for adding or dropping one channel, either before or after devices for compensating optical dispersion.

Figure 8:
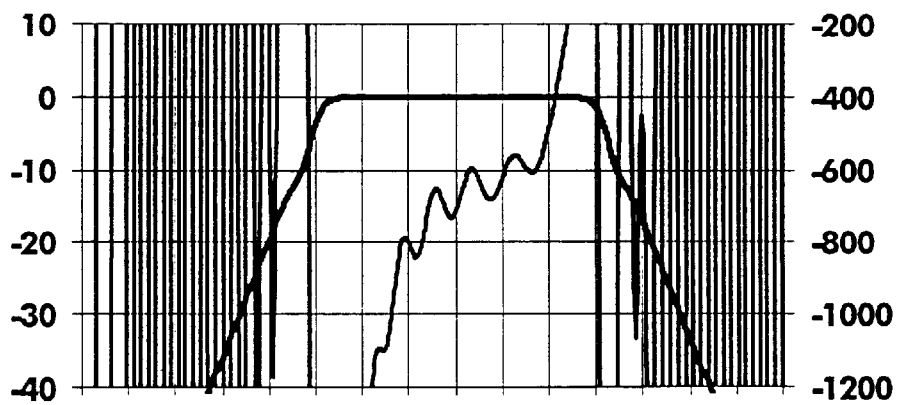
FIG. 8 is a graph showing the spectral response and the dispersion of a filter with apodization and constant pitch.
Figure 9:
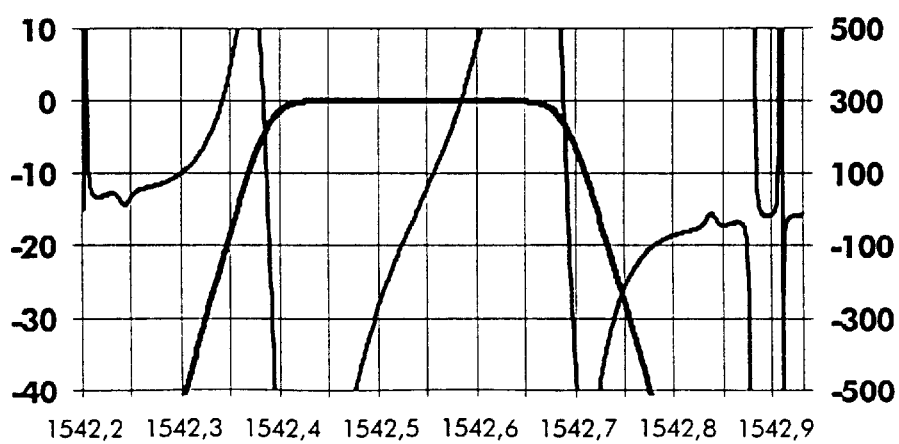
FIG. 9 is a graph of the spectral response and the dispersion of a filter with apodization, and pitch that varies linearly.

FIGS. 8 and 9 are graphs analogous to those of FIGS. 2 to 7 but for comparison purposes, relating to filters which do not implement the invention. The same notation and the same scales are used in both cases. FIG. 8 applies to a filter having Blackman apodization and constant pitch. Its parameters were as follows:

filter length L: 25 mm;

filter pitch: 534 nm;

filter bandwidth (measured at half maximum amplitude): 0.3 nm;

maximum amplitude of index modulation $\Delta n_{max}$: $3.1 \times 10^{-4}$; and Blackman coefficient B: 0.3.

The figure shows that the transfer function of the filter was similar in appearance to that of a filter of the invention, however chromatic dispersion varied considerably over the passband of the filter. Chromatic dispersion varied over a range of ±250 ps/nm over a bandwidth of 0.08 nm. This bandwidth is small compared with the 0.3 nm bandwidth of the filter. Variation over a range of ±150 ps/nm was restricted to about 0.05 nm, and was therefore much narrower than half the bandwidth of the filter. Consequently, in terms of chromatic dispersion, the filter was usable only over a small portion of its effective bandwidth.

FIG. 9 applies to a filter presenting a super-Gaussian apodization function and linear chirp. In this case, the characteristics of the filter were as follows:

filter length L: 50 mm;

filter pitch: between 534 nm and 534.17 nm, with a linear variation;

filter bandwidth (measured at half maximum amplitude): 0.3 nm;

maximum amplitude of index modulation $\Delta n_{max}$: $3.3 \times 10^{-4}$; and Blackman apodization coefficient: 0.3.

As can be seen in the figure, dispersion varied across the band of the filter. Chromatic dispersion varied over a range of ±150 ps/nm over a bandwidth of 0.13 nm; again, this range was rather small compared with the total bandwidth of the filter. Dispersion varied over a range of ±250 ps/nm over a bandwidth of 0.17 nm. Chromatic dispersion did not vary about a fixed value $D_0$.

Filters of the invention can be manufactured by the person skilled in the art using the information given above and implementing manufacturing techniques that are well known per se.

Naturally, the present invention is not limited to the examples and embodiments described and shown, and it can be varied in numerous ways by the person skilled in the art. The concepts of "beginning" and "end" are used for a grating by way of simplification, it being understood that properly speaking a grating written in a fiber does not have a privileged direction. The side, that is concave can thus be the opposite of that shown in the figures. The first and second portions of the grating can be inverted relative to the example shown in the figures.

What is claimed is:

1. A variable pitch Bragg grating having pitch, expressed as a function of distance, which is upwardly concave over a first portion of the grating and downwardly concave over a second portion of the grating, wherein said function is of zero slope at the ends of the grating, and wherein a tangent to the curve giving pitch as a function of distance presents, at each end of the grating, and over a distance of less than 10% of the length L of the grating, a slope whose absolute value is less than half the ratio $(\Lambda_{max}-\Lambda_{min})/L$ of pitch variation over the length of the grating.

2. The grating of claim 1, wherein the first portion extends over one half of the grating, and wherein the second portion extends over the other half of the grating.

3. The grating of claim 1, wherein the pitch is expressed as a quadratic function of distance over the first portion, and as a quadratic function of distance over the second portion.

4. The grating of claim 1, wherein the pitch is expressed as a linear function of distance over a third portion of the grating extending between said first and second portions.

5. The grating of claim 1, wherein the ratio of its −3 dB bandwidth over its −30 dB bandwidth lies in the range 0.5 to 1.

6. The grating of claim 1, wherein the grating provides a filter having a passband and the grating attenuation in reflection at 25 GHz from the center wavelength of the filter is greater than 35 dB.

7. An optical filter comprising a Bragg grating according to claim 1.

8. A WDM transmission system including at length one Bragg grating according to claim 1.

9. The grating of claim 1, having super-Gaussian apodization with an a coefficient in the range $0.5 \leq a < 1$.

10. The grating of claim 1, having hyperbolic tangent apodization with an exponent having a value greater than zero and less than one.

11. A variable pitch Bragg grating having pitch, expressed as a function of distance, which is upwardly concave over a first portion of the grating and downwardly concave over a second portion of the grating, wherein, over the first portion, the pitch is expressed as a function of distance that is a polynomial of degree less than 6 and, over the second portion, as a function of distance that is a polynomial of degree less than 6.

12. A variable pitch Bragg grating having pitch, expressed as a function of distance, which is upwardly concave over a first portion of the grating and downwardly concave over a second portion of the grating, the grating presenting variation in chromatic dispersion lying in a range of +150 ps/nm over a wavelength bandwidth equal to at least half its −3 dB bandwidth.

13. A variable pitch Bragg grating having pitch, expressed as a function of distance, which is upwardly concave over a first portion of the grating and downwardly concave over a second portion of the grating, wherein the grating provides a filter having a passband and the grating attenuation in reflection at 25 GHz from the center wavelength of the filter is greater than 30 dB.

14. A variable pitch Bragg grating having pitch, expressed as a function of distance, which is upwardly concave over a first portion of the grating and downwardly concave over a second portion of the grating, wherein the grating provides a filter and the grating attenuation in transmission at the center wavelength of the filter is less than 0.05 dB.

15. A variable pitch Bragg grating having pitch, expressed as a function of distance, which is upwardly concave over a first portion of the grating and downwardly concave over a second portion of the grating, the grating having a super-Gaussian apodization with an a coefficient in the range $0.5 \leq a < 1$.

16. A variable pitch Bragg grating having pitch, expressed as a function of distance, which is upwardly concave over a first portion of the grating and downwardly concave over a second portion of the grating, the grating having Blackman apodization with a Blackman coefficient which is greater than zero and less than 0.2.

17. A variable pitch Bragg grating having pitch, expressed as a function of distance, which is upwardly concave over a first portion of the grating and downwardly concave over a second portion of the grating, the grating having hyperbolic tangent apodization with an exponent having a value greater than zero and less than one.

* * * * *